No. 818,240. PATENTED APR. 17, 1906.
F. FISHER.
WAGON BRAKE.
APPLICATION FILED OCT. 13, 1905.
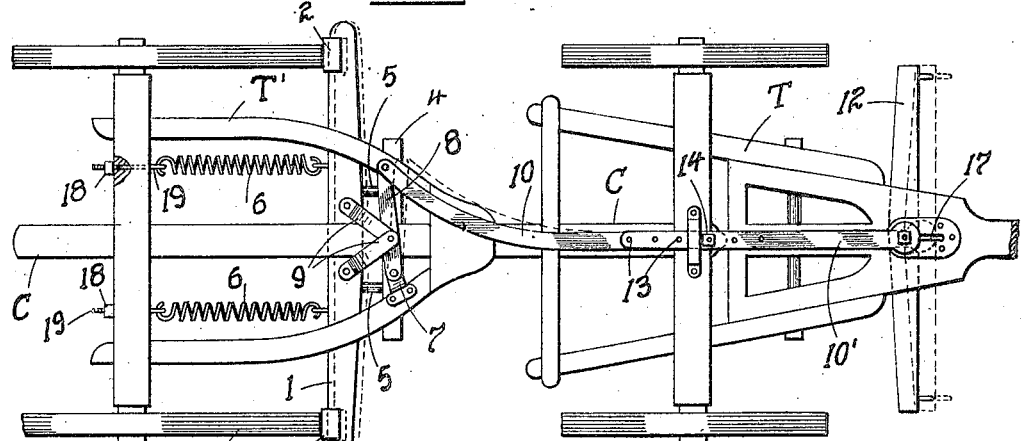
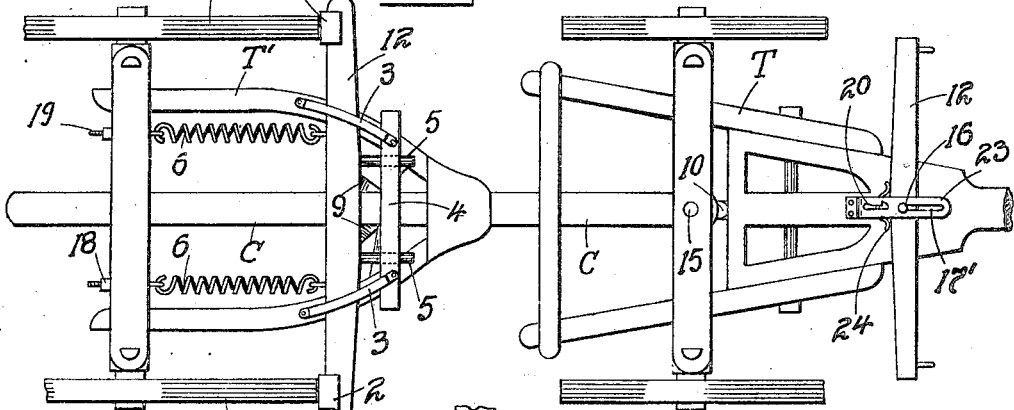
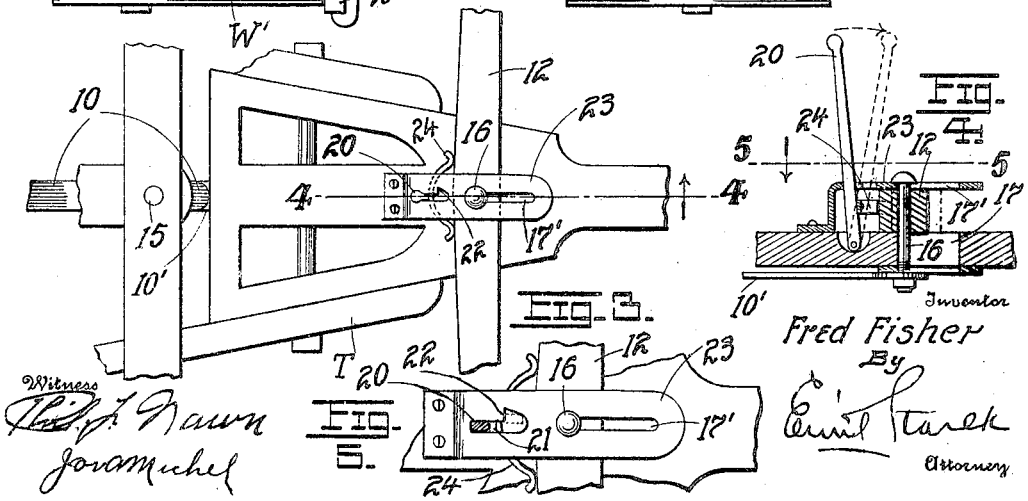
Inventor
Fred Fisher

UNITED STATES PATENT OFFICE.

FRED FISHER, OF IRONTON, MISSOURI, ASSIGNOR TO CHARLES MADLINGER, OF IRONTON, MISSOURI.

WAGON-BRAKE.

No. 818,240.     Specification of Letters Patent.     Patented April 17, 1906.

Application filed October 13, 1905. Serial No. 282,621.

*To all whom it may concern:*

Be it known that I, FRED FISHER, a citizen of the United States, residing at Ironton, in the county of Iron and State of Missouri, have invented certain new and useful Improvements in Wagon-Brakes, of which the following is a full, clear, and exact description, reference being had to the accompanying drawings, forming a part hereof.

My invention has relation to improvements in wagon-brakes; and it consists in the novel construction and arrangement of parts more fully set forth in the specification and pointed out in the claims.

In the drawings, Figure 1 is a bottom plan view of a wagon having my brake attached thereto. Fig. 2 is a top plan of the same. Fig. 3 is a top plan of the central portion of the front truck, showing the application of the invention. Fig. 4 is a vertical sectional detail on the line 4 4 of Fig. 3, and Fig. 5 is a horizontal section on line 5 5 of Fig. 4.

The object of my invention is to equip a wagon with a brake which shall be automatically applied (preferably) to the wheels of the rear truck the moment the draft on the doubletree shall have slackened for any reason, as where, for example, the animals are descending a hill or whenever the vehicle comes to a stop.

A further object is to provide means for controlling the brakes directly by the driver in the event it is not desirable that the same be applied under the circumstances referred to.

In detail the invention may be described as follows:

Referring to the drawings, T represents the front truck of a wagon, T' the rear truck, and C the coupling-pole. Mounted on top of the rear truck and having a reciprocating movement parallel to the coupling-pole is a brake-beam 1, having terminal brake-shoes 2 2 for engaging the tire of the rear wheels W'. The brake-beam passes under a pair of straps 3, secured, respectively, to the truck T' and to a transverse block 4, secured to or forming a part of the truck. In its reciprocations the brake-beam is guided by stems 5 5, which pass loosely through the block 4. Under normal conditions—that is, when the wagon is standing still and the draft-animals are detached—the brake-shoes are firmly set against the wheels W' by the contracting springs 6 6, coupled, respectively, to the brake-beam and to the rear member of the truck T'. Pivoted beneath the block 4 to a bracket or arm 7, secured to the bottom of the rear truck, is one end of a lever 8, which at an intermediate point is coupled to the brake-beam by the links 9 9, the opposite end of the lever being pivotally connected to the rear section 10 of a pull-bar, the front section 10' of said pull-bar being pivotally coupled at its front end to the doubletree 12. To allow for the proper extension of the wagon or separation of the trucks, the section 10' overlaps the section 10 sufficiently, so that the wagon may be lengthened to any desirable degree. For this purpose the section 10' is provided with a series of openings 13, through any one of which and through an opening (not shown) formed in the section 10 a screw-bolt can be passed and subsequently fastened in position by a nut 14. This arrangement forms a pivotal connection between the sections 10 10', allowing the front truck to freely oscillate about the king-pin 15. The pin-bolt 16, which couples the doubletree 12 to the section 10' of the pull-bar, operates in a longitudinally-elongated slot 17 in the front truck, this construction not only permitting the doubletree to oscillate about the bolt 16, but to be drawn forward the length of the slot 17. When therefore the draft-animals are attached to the doubletree, (or more properly to the swingletrees not here shown, but usually carried by the doubletree,) the moment they draw on the doubletree the latter will be moved forwardly along the slot 17, the draft on the bolt 16 exerting itself on the pull-bars 10 10', which in turn tilt the lever 8 sufficiently to draw the brake-beam away from the wheels W', and thus release the brakes, (see dotted position of the parts in Fig. 1,) so that as long as the animals pull on the doubletree the brakes will be released. The tension of the springs is adjusted by the nuts 18 at the screw-threaded ends of the eyebolts 19, to which the adjacent ends of the springs are attached.

Under some circumstances it is desirable to hold the brakes released even though the animals are not drawing on the doubletree or even when the animals are detached from the vehicle altogether. For this purpose I provide a lever 20, pivoted at the base to the front truck, the lever passing through an elongated slot 21, terminating at its forward end in an offset or shoulder 22, formed in an angle-plate or bracket 23, secured to the front truck, the doubletree passing under the horizontal arm or member of said angle-plate and being guided thereby. The pin-bolt 16 passes through the elongated slot 17' of said angle-plate, which slot is directly over the slot 17 of the truck. To the lever 20 at a point opposite the doubletree is secured a brace or shoe 24, which bears against the adjacent face of the doubletree. The driver by forcing or oscillating the lever 20 forward in the direction shown by dotted position in Fig. 4 forces the shoe 24 against the doubletree, forcing the latter forward and disengaging the brakes in a manner similar to their disengagement by the draft of the animals. In this forward oscillation the lever comes opposite the shoulder 22, when the driver by a slight lateral jerk may bring the lever to rest against said shoulder, thus preventing the return of the lever to its original position and leaving the brakes released for any time the driver desires. Thus the brakes may be controlled by the driver even should the horses be altogether detached from the wagon.

It is to be understood that the term "doubletree" as used in the claims contemplates a swingletree on vehicles which do not use a doubletree, as I do not wish to limit the application of the invention to doubletrees specifically.

Having described my invention, what I claim is—

1. In combination with an oscillating doubletree having a movement lengthwise of the vehicle, a lever pivoted to the rear thereof, a brace or shoe carried by the lever above its pivotal point and adapted to be forced against the doubletree, an angle-plate having a recess or slot for the passage of the lever, an offset or shoulder in the slot for locking the lever in position, a brake-beam, and connections between the doubletree and brake-beam, substantially as set forth.

2. In combination with a reciprocating brake-beam, means for guiding the same, springs for forcing the beam against the wheels of the wagon-truck, a lever pivoted at one end below the truck, links connecting an intermediate point of said lever to the brake-beam, a pull-bar leading from the opposite end of the lever, and a doubletree movable lengthwise of the wagon coupled to the front end of the pull-bar, the parts operating substantially as, and for the purpose set forth.

In testimony whereof I affix my signature in presence of two witnesses.

FRED FISHER.

Witnesses:
C. P. DAMRON.
A. S. PRINCE.